US012338505B2

(12) United States Patent
Hirashima et al.

(10) Patent No.: US 12,338,505 B2
(45) Date of Patent: Jun. 24, 2025

(54) STEEL SHEET, MEMBER, AND METHODS FOR PRODUCING THE SAME

(71) Applicant: JFE STEEL CORPORATION, Tokyo (JP)

(72) Inventors: Takuya Hirashima, Tokyo (JP); Shimpei Yoshioka, Tokyo (JP); Shinjiro Kaneko, Tokyo (JP); Soshi Yoshimoto, Tokyo (JP); Tomohiro Hashimukai, Tokyo (JP); Yoshihiko Ono, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 611 days.

(21) Appl. No.: 17/639,086

(22) PCT Filed: Aug. 25, 2020

(86) PCT No.: PCT/JP2020/031994
§ 371 (c)(1),
(2) Date: Feb. 28, 2022

(87) PCT Pub. No.: WO2021/039776
PCT Pub. Date: Mar. 4, 2021

(65) Prior Publication Data
US 2022/0298594 A1 Sep. 22, 2022

(30) Foreign Application Priority Data
Aug. 30, 2019 (JP) ................. 2019-158802

(51) Int. Cl.
C21D 9/46 (2006.01)
C21D 1/18 (2006.01)
C21D 6/00 (2006.01)
C21D 8/02 (2006.01)
C22C 38/00 (2006.01)
C22C 38/02 (2006.01)
C22C 38/06 (2006.01)
C22C 38/08 (2006.01)
C22C 38/12 (2006.01)
C22C 38/14 (2006.01)
C22C 38/16 (2006.01)
C22C 38/38 (2006.01)

(52) U.S. Cl.
CPC ................. C21D 9/46 (2013.01); C21D 1/18 (2013.01); C21D 6/001 (2013.01); C21D 6/002 (2013.01); C21D 6/005 (2013.01); C21D 6/008 (2013.01); C21D 8/0205 (2013.01); C21D 8/0226 (2013.01); C21D 8/0236 (2013.01); C22C 38/001 (2013.01); C22C 38/002 (2013.01); C22C 38/008 (2013.01); C22C 38/02 (2013.01); C22C 38/06 (2013.01); C22C 38/08 (2013.01); C22C 38/12 (2013.01); C22C 38/14 (2013.01); C22C 38/16 (2013.01); C22C 38/38 (2013.01)

(58) Field of Classification Search
CPC ... C21D 1/18; C21D 1/60; C21D 1/63; C21D 6/00; C21D 6/001; C21D 6/002; C21D 6/005; C21D 6/008; C21D 8/0205; C21D 8/0226; C21D 8/0236; C21D 8/0247; C21D 9/46; C21D 9/573; C21D 2211/005; C21D 2211/008; C21D 8/0273; C22C 38/00; C22C 38/001; C22C 38/002; C22C 38/008; C22C 38/02; C22C 38/06; C22C 38/08; C22C 38/12; C22C 38/14; C22C 38/16; C22C 38/38; C22C 38/60; C22C 38/04; C22C 38/22; C22C 38/24; C22C 38/26; C22C 38/28; C22C 38/34
See application file for complete search history.

(56) References Cited

U.S. PATENT DOCUMENTS 4,274,273 A 6/1981 Fapiano et al.
2017/0327926 A1* 11/2017 Yoshimoto ............. C21D 9/563

FOREIGN PATENT DOCUMENTS

| CN | 101993995 A | 3/2011 |
| CN | 105074040 A | 11/2015 |
| EP | 0 080 932 A1 | 6/1983 |
| EP | 1 991 375 A1 | 11/2008 |
| EP | 2 376 241 A1 | 10/2011 |
| EP | 2 960 353 A1 | 12/2015 |
| EP | 3 140 057 A1 | 3/2017 |
| EP | 3 272 892 A1 | 1/2018 |
| JP | H02-38532 A | 2/1990 |

(Continued)

OTHER PUBLICATIONS

Nov. 17, 2020 International Search Report issued in International Patent Application No. PCT/JP2020/031994.
Jan. 28, 2023 Office Action issued in Chinese Patent Application No. 202080059851.7.
May 13, 2022 Extended European Search Report issued in European Patent Application No. 20856777.6.

(Continued)

Primary Examiner — Nicholas A Wang
(74) Attorney, Agent, or Firm — Oliff PLC

(57) ABSTRACT

A steel sheet having a steel microstructure including, by area %, martensite in a range of 20% or more and 100% or less, ferrite in a range of 0% or more and 80% or less, and the balance being 5% or less. A residual stress generated at the transverse center of the steel sheet when the steel sheet is subjected to a V-bending process is 800 MPa or less. A residual stress generated at the transverse end of the steel sheet when the steel sheet is subjected to a V-bending process is 90% or more and 110% or less of the residual stress generated at the transverse center of the steel sheet. The maximum amount of warpage of the steel sheet sheared to a length of 1 m in the longitudinal direction is 15 mm or less.

14 Claims, No Drawings

(56) References Cited

FOREIGN PATENT DOCUMENTS

| | | |
|---|---|---|
| JP | H11-193418 A | 7/1999 |
| JP | 2003-277833 A | 10/2003 |
| JP | 2010-90432 A | 4/2010 |
| JP | 6094722 B2 | 3/2017 |
| JP | 2018/109222 A | 7/2018 |
| JP | 2020-19992 A | 2/2020 |
| WO | 2016/084283 A1 | 6/2016 |
| WO | 2018/123356 A1 | 7/2018 |
| WO | 2020/026838 A1 | 2/2020 |
| WO | 2020/090302 A1 | 5/2020 |

OTHER PUBLICATIONS

Jun. 30, 2022 Office Action issued in Chinese Patent Application No. 202080059851.7.

\* cited by examiner

STEEL SHEET, MEMBER, AND METHODS FOR PRODUCING THE SAME

TECHNICAL FIELD

This application relates to a steel sheet and a member that are used for producing automotive parts and the like and methods for producing the steel sheet and the member. This application relates specifically to a steel sheet and a member that have a high strength, excellent shape uniformity, and excellent delayed fracture resistance and methods for producing the steel sheet and the member.

BACKGROUND

Further improvement of the fuel economy of automobiles has been anticipated in the whole automotive industry in order to reduce $CO_2$ emissions for conservation of the global environment. Since one of the most effective approaches to improving the fuel economy of automobiles is to reduce the weights of automobiles by reducing the thicknesses of automotive parts, the amount of high-strength steel sheets used as materials for automotive parts has been being increased.

There have been provided many steel sheets that include martensite, which is a hard phase, in order to increase the strength of the steel sheets. However, when martensite is formed, transformation strain degrades the uniformity of the shape of a steel sheet. Since the degradation of the uniformity of the shape of a steel sheet adversely affects dimensional accuracy achieved in forming, steel sheets have been corrected by levelling or skin pass rolling (temper rolling) in order to achieve an intended dimensional accuracy. However, introduction of strain by levelling or skin pass rolling degrades dimensional accuracy achieved in forming and makes it impossible to achieve the intended dimensional accuracy. For increasing the dimensional accuracy, it is necessary to limit the degradation of the uniformity of the shape of a steel sheet which occurs during martensite transformation. There have been proposed various techniques.

For example, in Patent Literature 1, shape uniformity and delayed fracture resistance are improved by controlling the area fractions of ferrite and martensite. Specifically, an ultrahigh-strength steel sheet having suitable shape uniformity and suitable delayed fracture resistance is provided by using a multi-phase steel having a metal microstructure including, by volume, 50% to 80% tempered-martensite phase and 20% to 50% ferrite phase in order to reduce the entry of hydrogen.

Patent Literature 2 provides a technique in which the degradation of the shape of a steel sheet which is caused due to martensite transformation during water quenching is limited by binding the steel sheet with rollers in water.

CITATION LIST

Patent Literature

PTL 1: Japanese Unexamined Patent Application Publication No. 2010-90432
PTL 2: Japanese Patent No. 6094722

SUMMARY

Technical Problem

Since the steel sheets used for producing automotive bodies are subjected to press forming before use, suitable shape uniformity is an essential property. In addition, since the amount of high-strength steel sheets used as materials for automotive parts has been being increased, it is necessary that delayed fracture resistance, to which particular concern is given with an increase in strength, be at a suitable level. Since automotive parts are taken from a steel sheet so as to extend over the full width of the steel sheet (hereinafter, also referred to as "steel sheet full-width"), it is necessary that delayed fracture resistance be at an excellent level over the steel sheet full-width in a consistent manner. Thus, such steel sheets need to have a high strength, excellent shape uniformity, and excellent delayed fracture resistance over the steel sheet full-width.

The techniques disclosed in Patent Literature 1 include a technique in which shape uniformity and delayed fracture resistance are enhanced by microstructure control. However, it is considered that the improvement of shape uniformity is less than that achieved in the disclosed embodiments, because a transformation expansion that occurs upon martensite transformation causes shape degradation.

The techniques disclosed in Patent Literature 2 include a technique that enhances shape uniformity but do not include a technique that enhances delayed fracture resistance to an excellent level.

An object of the disclosed embodiments is to provide a steel sheet and a member that have a high strength, excellent shape uniformity, and excellent delayed fracture resistance and methods for producing the steel sheet and the member.

Solution to Problem

In order to address the above issues, the inventors conducted extensive studies of the requirements pertaining to a steel sheet having a tensile strength of 750 MPa or more, excellent shape uniformity, and excellent delayed fracture resistance and consequently found that, for achieving excellent delayed fracture resistance, it is necessary that the residual stress generated at the transverse center of the steel sheet be limited to be 800 MPa or less. The inventors also found that the high strength can be achieved by adjusting the volume fraction of martensite to be 20% or more by area by performing rapid cooling. However, martensite transformation occurs during water cooling at a high speed in an uneven manner, and the resulting transformation strain degrades the uniformity of the shape of the steel sheet. On the basis of the results of studies on reductions in the adverse effects of transformation strain, it was conceived that shape uniformity can be enhanced by applying a binding force onto the front and rear surfaces of the steel sheet during martensite transformation. It was also found that controlling the binding conditions reduces fluctuations in residual stress in the transverse direction and enhances delayed fracture resistance over the steel sheet full-width.

As described above, the inventors conducted various studies in order to address the above issues, consequently found that reducing the residual stress generated at the transverse center of a steel sheet enables the production of a steel sheet having excellent delayed fracture resistance and controlling the roller binding conditions enables the production of a steel sheet having excellent shape uniformity and excellent delayed fracture resistance over the steel sheet full-width, and made the disclosed embodiments.

The summary of the disclosed embodiments is as described below.

[1] A steel sheet which has a steel microstructure including, by area, martensite: 20% or more and 100% or less, ferrite: 0% or more and 80% or less, and the balance: 5% or less, in which:

a residual stress generated at a transverse center of the steel sheet when the steel sheet is subjected to a V-bending process is 800 MPa or less;

a residual stress generated at a transverse end of the steel sheet when the steel sheet is subjected to a V-bending process is 90% or more and 110% or less of the residual stress generated at the transverse center of the steel sheet; and a maximum amount of warpage of the steel sheet sheared to a length of 1 m in a longitudinal direction of the steel sheet is 15 mm or less.

[2] The steel sheet described in [1], which has a chemical composition containing, by mass, C: 0.05% or more and 0.60% or less,
Si: 0.01% or more and 2.0% or less,
Mn: 0.1% or more and 3.2% or less,
P: 0.050% or less,
S: 0.0050% or less,
Al: 0.005% or more and 0.10% or less, and
N: 0.010% or less, with the balance being Fe and incidental impurities.

[3] The steel sheet described in [2], in which the chemical composition further contains at least one selected from, by mass, Cr: 0.01% or more and 0.50% or less,
Mo: 0.01% or more and less than 0.15%, and
V: 0.001% or more and 0.05% or less.

[4] The steel sheet described in [2] or [3], in which the chemical composition further contains at least one selected from, by mass, Nb: 0.001% or more and 0.020% or less, and
Ti: 0.001% or more and 0.020% or less.

[5] The steel sheet described in any one of [2] to [4], in which the chemical composition further contains at least one selected from, by mass, Cu: 0.001% or more and 0.20% or less, and
Ni: 0.001% or more and 0.10% or less.

[6] The steel sheet described in any one of [2] to [5], in which the chemical composition further contains, by mass, B: 0.0001% or more and less than 0.0020%.

[7] The steel sheet described in any one of [2] to [6], in which the chemical composition further contains at least one selected from, by mass, Sb: 0.002% or more and 0.1% or less, and
Sn: 0.002% or more and 0.1% or less.

[8] A method for producing a steel sheet, the method includes:

a hot-rolling step of heating a steel slab having the chemical composition described in any one of [2] to [7] and hot-rolling the steel slab; and an annealing step of holding a hot-rolled steel sheet prepared in the hot-rolling step at an annealing temperature equal to or higher than an $A_{C_1}$ temperature for 30 seconds or more, subsequently starting water quenching at a temperature equal to or higher than a Ms temperature, and, subsequent to water cooling to 100° C. or less, performing reheating to a temperature of 100° C. or more and 300° C. or less, wherein, while the water cooling is performed for the water quenching in the annealing step, the steel sheet is bound with two rollers arranged to abut onto front and rear surfaces of the steel sheet so as to face each other across the steel sheet when a surface temperature of the steel sheet is equal to or lower than (Ms temperature+150° C.), and a ratio of a binding pressure applied to a transverse center of the steel sheet to a binding pressure applied to a transverse end of the steel sheet at a position at which the steel sheet is bound with the two rollers is 1.05 or more and 2.0 or less.

[9] A method for producing a steel sheet, the method includes:

a hot-rolling step of heating a steel slab having the chemical composition described in any one of [2] to [7] and hot-rolling the steel slab;

a cold-rolling step of cold-rolling a hot-rolled steel sheet prepared in the hot-rolling step; and an annealing step of holding a cold-rolled steel sheet prepared in the cold-rolling step at an annealing temperature equal to or higher than an $A_{C_1}$ temperature for 30 seconds or more, subsequently starting water quenching at a temperature equal to or higher than a Ms temperature, and, subsequent to water cooling to 100° C. or less, performing reheating to a temperature of 100° C. or more and 300° C. or less, wherein, while the water cooling is performed for the water quenching in the annealing step, the steel sheet is bound with two rollers arranged to abut onto front and rear surfaces of the steel sheet so as to face each other across the steel sheet when a surface temperature of the steel sheet is equal to or lower than (Ms temperature+150° C.), and a ratio of a binding pressure applied to a transverse center of the steel sheet to a binding pressure applied to a transverse end of the steel sheet at a position at which the steel sheet is bound with the two rollers is 1.05 or more and 2.0 or less.

[10] A member produced by subjecting the steel sheet described in any one of [1] to [7] to at least one of a forming process and welding.

[11] A method for producing a member, the method includes a step of subjecting a steel sheet produced by the method for producing a steel sheet described in [8] or [9] to at least one of a forming process and welding.

Advantageous Effects

According to the disclosed embodiments, a steel sheet and a member that have a high strength, excellent shape uniformity, and excellent delayed fracture resistance and methods for producing the steel sheet and the member can be provided. Using the steel sheet according to the disclosed embodiments for producing automotive structural members enables an increase in the strength of automotive steel sheets and improvement of delayed fracture resistance of automotive steel sheets to be both achieved. That is, the disclosed embodiments enhance the performance of automotive bodies.

DETAILED DESCRIPTION

Disclosed embodiments are described below. The disclosure is not intended to be limited by the following specific embodiments.

The steel sheet according to the disclosed embodiments has a steel microstructure including, by area, martensite: 20% or more and 100% or less, ferrite: 0% or more and 80% or less, and the balance: 5% or less. A residual stress generated at the transverse center of the steel sheet when the steel sheet is subjected to a V-bending process (hereinafter, this residual stress may be referred to simply as "residual stress at the transverse center") is 800 MPa or less. A residual stress generated at the transverse end of the steel sheet when the steel sheet is subjected to a V-bending process is 90% or more and 110% or less of the residual stress generated at the transverse center. The maximum amount of warpage of the steel sheet sheared to a length of 1 m in the longitudinal direction is 15 mm or less. Any steel sheet that satisfies the above-described conditions has the above-described advantageous effects according to the disclosed embodiments; the chemical composition of the steel sheet is not limited.

The thickness of the steel sheet is preferably 0.2 mm or more and 3.2 mm or less.

First, the steel microstructure of the steel sheet according to the disclosed embodiments is described. The steel microstructure of the steel sheet according to the disclosed embodiments contains, by area, martensite: 20% or more and 100% or less, ferrite: 0% or more and 80% or less, and the balance: 5% or less.

Martensite Area Fraction: 20% or More and 100% or Less

The area fraction of martensite is limited to be 20% or more in order to achieve a high strength of TS 750 MPa. If the area fraction of martensite is less than 20%, the fraction of any of ferrite, retained austenite, pearlite, and bainite is increased and strength is reduced consequently. The area fraction of martensite may be 100% in total. The area fraction of martensite is preferably 30% or more in order to increase strength. The amount of martensite is the total amount of as-quenched fresh martensite and tempered martensite. The term "martensite" used herein refers to a hard microstructure formed from austenite at a temperature equal to or lower than the martensite transformation temperature (hereinafter, may be referred to simply as "Ms temperature"). The term "tempered martensite" used herein refers to a microstructure formed by tempering when martensite is reheated.

Ferrite Area Fraction: 0% or More and 80% or Less

The area fraction of ferrite is limited to be 80% or less in order to maintain a certain strength of the steel sheet. The above area fraction may be 0%. The term "ferrite" used herein refers to a microstructure transformed from austenite at relatively high temperatures and formed of BCC-lattice crystal grains.

Balance Area Fraction: 5% or Less

The steel microstructure of the steel sheet according to the disclosed embodiments may include, as a balance other than martensite or ferrite, a metallic phase incidentally included in the steel microstructure. The allowable area fraction of the balance is 5% or less. Examples of the phase included as a balance include retained austenite, pearlite, and bainite. The term "retained austenite" used herein refers to austenite that does not transform into martensite and remains even after the temperature has been reduced to room temperature. The term "pearlite" used herein refers to a microstructure formed of ferrite and acicular cementite. The term "bainite" used herein refers to a hard microstructure formed from austenite at relatively low temperatures (equal to or higher than the martensite transformation temperature), the microstructure including acicular or plate-like ferrite grains and fine carbide grains dispersed therein.

The area fractions of the above microstructure components in the steel microstructure are measured by the method described in Examples below.

Residual Stress Generated at Transverse Center of Steel Sheet when Steel Sheet is Subjected to V-Bending Process is 800 MPa or Less The term "V-bending process" used herein refers to a bending process performed at a bending angle of 90° such that the direction of the bending ridge line is parallel to the transverse direction of the steel sheet. The steel sheet according to the disclosed embodiments has excellent delayed fracture resistance. Specifically, the critical load stress determined by conducting the delayed fracture test described in Examples below is equal to or higher than the yield strength (hereinafter, referred to simply as "YS"). The above critical load stress is preferably (YS+100) MPa or more and is more preferably (YS+200) MPa or more. For adjusting the critical load stress to be equal to or higher than the YS, it is necessary to limit the residual stress generated at the transverse center of the steel sheet when the steel sheet is subjected to a V-bending process to be 800 MPa or less. In order to achieve excellent delayed fracture resistance, the above residual stress is preferably 780 MPa or less, is more preferably 700 MPa or less, and is further preferably 600 MPa or less.

Residual Stress Generated at Transverse End of Steel Sheet when Steel Sheet is Subjected to V-Bending Process is 90% or More and 110% or Less of the Residual Stress Generated at Transverse Center The steel sheet according to the disclosed embodiments has excellent delayed fracture resistance over the steel sheet full-width. Specifically, when the steel sheet is subjected to a V-bending process to measure a critical load stress at the transverse center and transverse end of the steel sheet, the critical load stress measured at the transverse end is 90% or more and 110% or less, is preferably 92% or more and 108% or less, and is more preferably 95% or more and 105% or less of the critical load stress measured at the transverse center. For adjusting the critical load stress measured at the transverse end to be 90% or more and 110% or less of the critical load stress measured at the transverse center, it is necessary to limit the residual stress generated at the transverse end of the steel sheet when the steel sheet is subjected to a V-bending process to be 90% or more and 110% or less of the residual stress generated at the transverse center. In order to enhance delayed fracture resistance to an excellent level, the residual stress generated at the transverse end of the steel sheet when the steel sheet is subjected to a V-bending process is preferably 92% or more and 108% or less and is more preferably 95% or more and 105% or less of the residual stress generated at the transverse center.

Maximum Amount of Warpage of Steel Sheet Sheared to Length of 1 m in Longitudinal Direction is 15 mm or Less The steel sheet according to the disclosed embodiments has suitable shape uniformity. Specifically, the maximum amount of warpage of the steel sheet sheared to a length of 1 m in the longitudinal direction (the rolling direction) is 15 mm or less. The maximum amount of warpage is preferably 13 mm or less, is more preferably 12 mm or less, and is further preferably 10 mm or less. The lower limit for the maximum amount of warpage is not set but is most preferably 0 mm.

The term "the maximum amount of warpage of the steel sheet sheared to a length of 1 m in the longitudinal direction" used herein refers to the amount determined by shearing the steel sheet to a size having the same width as the steel sheet and a length of 1 m in the longitudinal direction (the rolling direction) of the steel sheet, placing the sheared steel sheet on a horizontal stage, and measuring the distance between the horizontal stage and the steel sheet at a position at which the amount of gap between the horizontal stage and the lower portion of the steel sheet is the maximum. Note that the above distance is measured in a direction (the vertical direction) perpendicular to the horizontal plane of the horizontal stage. The maximum amount of warpage is the maximum between the amount of warpage measured with one of the surfaces of the steel sheet facing upward and the amount of warpage measured with the other surface of the steel sheet facing upward. The sheared steel sheet is placed on the horizontal stage such that the number of contact points at which the corners of the steel sheet and the horizontal stage come into contact with each other is maximized (two or more). The amount of warpage is determined by lowering a horizontal plate from a position above the steel sheet until it comes into contact with the steel sheet and subtracting the thickness of the steel sheet from the distance between the horizontal stage and the horizontal plate at the position at which the horizontal plate is in contact with the steel sheet.

The steel sheet according to the disclosed embodiments has a high strength. The term "high strength" used herein refers to a tensile strength of 750 MPa or more which is measured by the method described in Examples below. The tensile strength of the steel sheet is preferably 950 MPa or more, is more preferably 1150 MPa or more, and is further preferably 1300 MPa or more. Although the upper limit for the tensile strength of the steel sheet is not set, the tensile strength of the steel sheet is preferably 2500 MPa or less in consideration of ease of achieving the balance between strength and the other properties.

A chemical composition preferable for producing the steel sheet according to the disclosed embodiments is described below. In the description of chemical composition below, the symbol "%" used as a unit of the content of a constituent refers to "% by mass".

C: 0.05% or More and 0.60% or Less

C is an element that enhances hardenability and is necessary for achieving the predetermined area fraction of martensite. C is also necessary for increasing the strength of martensite and maintaining the strength. The C content is preferably 0.05% or more in order to maintain excellent delayed fracture resistance and achieve the predetermined strength. In order to achieve TS 950 MPa, the lower limit for the C content is preferably 0.11% or more. In order to further increase tensile strength, the lower limit for the C content is further preferably 0.125% or more. However, if the C content exceeds 0.60%, strength may be increased to an excessive level and it may become difficult to limit transformation expansion caused due to martensite transformation. Consequently, shape uniformity may become degraded. Accordingly, the C content is preferably 0.60% or less. The C content is more preferably 0.50% or less and is further preferably 0.40% or less.

Si: 0.01% or More and 2.0% or Less

Si is an element that increases strength by solid-solution strengthening. In order to achieve the above advantageous effect in a sufficient manner, the Si content is preferably 0.01% or more. The Si content is more preferably 0.02% or more and is further preferably 0.03% or more. However, if the Si content is excessively high, the likelihood of formation of coarse MnS in the thickness direction of the steel sheet is increased, the residual stress generated at the transverse center of the steel sheet is increased, and, consequently, delayed fracture resistance may become degraded. Accordingly, the Si content is preferably 2.0% or less. The Si content is more preferably 1.7% or less and is further preferably 1.5% or less.

Mn: 0.1% or More and 3.2% or Less

Mn is included in the steel in order to enhance the hardenability of the steel and achieve the predetermined area fraction of martensite. If the Mn content is less than 0.1%, ferrite may be formed in the surface-layer portion of the steel sheet, which reduces strength. Accordingly, the Mn content is preferably 0.1% or more. The Mn content is more preferably 0.2% or more and is further preferably 0.3% or more.

On the other hand, Mn is an element that particularly facilitates the formation and coarsening of MnS disadvantageously. Therefore, if the Mn content exceeds 3.2%, the amount of coarse inclusions is increased, the residual stress generated at the transverse center of the steel sheet is increased, and, consequently, delayed fracture resistance may become degraded. Accordingly, the Mn content is preferably 3.2% or less. The Mn content is more preferably 3.0% or less and is further preferably 2.8% or less.

P: 0.050% or Less

P is an element that increases the strength of the steel. However, if the P content is high, P segregates at grain boundaries, the residual stress generated at the transverse center of the steel sheet is increased, and, consequently, delayed fracture resistance may become degraded. Accordingly, the P content is preferably 0.050% or less. The P content is more preferably 0.030% or less and is further preferably 0.010% or less. The lower limit for the P content is not limited. The lower limit for the P content which is industrially possible is about 0.003%.

S: 0.0050% or Less

If the S content is excessively high, inclusions such as MnS, TiS, and Ti(C,S) may be formed in excessive amounts, which degrade delayed fracture resistance. In order to limit the degradation of delayed fracture resistance, the S content is preferably 0.0050% or less. The S content is more preferably 0.0020% or less, is further preferably 0.0010% or less, and is particularly preferably 0.0005% or less. The lower limit for the S content is not limited. The lower limit for the S content which is industrially possible is about 0.0002%.

Al: 0.005% or More and 0.10% or Less

Al is added to the steel in order to perform deoxidization to a sufficient degree and reduce the amount of coarse inclusions present in the steel. In order to achieve the above advantageous effects in a sufficient manner, the Al content is preferably 0.005% or more. The Al content is more preferably 0.010% or more. However, if the Al content exceeds 0.10%, it becomes difficult to dissolve carbides including Fe as a principal constituent which are formed when coiling is performed subsequent to hot rolling, such as cementite, in the annealing step and, as a result, coarse inclusions and carbides may be formed. This reduces the strength of the steel sheet. In addition, the residual stress generated at the transverse center of the steel sheet is increased and, consequently, delayed fracture resistance may become degraded. Accordingly, the Al content is preferably 0.10% or less. The Al content is more preferably 0.08% or less and is further preferably 0.06% or less.

N: 0.010% or Less

N is an element that forms coarse nitride and carbonitride inclusions, such as TiN, (Nb,Ti) (C,N), and AlN, in the steel. If the N content is excessively high, delayed fracture resistance may become degraded due to the formation of coarse inclusions. In order to prevent the degradation of delayed fracture resistance, the N content is preferably 0.010% or less. The N content is preferably 0.007% or less and is further preferably 0.005% or less. The lower limit for the N content is not set. The lower limit for the N content which is industrially possible is about 0.0006%.

It is preferable that the steel sheet according to the disclosed embodiments includes the above constituents as fundamental constituents and the balance be Fe (iron) and incidental impurities. The steel sheet according to the disclosed embodiments may include the following constituents as optional constituents such that the effects according to the disclosed embodiments are not impaired. In the case where the contents of the optional constituents below are less than the lower limits, it is considered that the constituents are included in the incidental impurities.

At Least One Selected from Cr: 0.01% or More and 0.50% or Less, Mo: 0.01% or More and Less than 0.15%, and V: 0.001% or More and 0.05% or Less Cr, Mo, and V may be added to the steel in order to enhance the hardenability of the steel. In order to achieve the above advantageous effect, the Cr and Mo contents are each preferably 0.01% or more. The Cr and Mo contents are each more preferably 0.02% or more and are each further preferably 0.03% or more. The V content is preferably 0.001% or more, is more preferably 0.002% or more, and is further preferably 0.003% or more. However, if the contents of the above elements are excessively high, coarsening of carbides occurs, the residual stress generated at the transverse center of the steel sheet is increased, and, consequently, delayed fracture resistance may become degraded. Accordingly, the Cr content is preferably 0.50% or less and is more preferably 0.1% or less. The Mo content is preferably less than 0.15% and is more preferably 0.10% or less. The V content is preferably 0.05% or less, is more preferably 0.04% or less, and is further preferably 0.03% or less.

At Least One Selected from Nb: 0.001% or More and 0.020% or Less and Ti: 0.001% or More and 0.020% or Less Nb and Ti contribute to an increase in strength by reducing the size of prior-$\gamma$ grains. In order to achieve the above advantageous effect, the Nb and Ti contents are each preferably 0.001% or more. The Nb and Ti contents are each more preferably 0.002% or more and are each further preferably 0.003% or more. However, if the Nb and Ti contents are excessively high, the amounts of coarse Nb precipitates, such as NbN, Nb(C,N), and (Nb,Ti) (C,N), and coarse Ti precipitates, such as TiN, Ti(C,N), Ti(C,S), and TiS, which do not dissolve when slabs are heated in the hot-rolling step and remain in the steel are increased, the residual stress generated at the transverse center of the steel sheet is increased, and, consequently, delayed fracture resistance may become degraded. Accordingly, the Nb and Ti contents are each preferably 0.020% or less. The Nb and Ti contents are each more preferably 0.015% or less and are each further preferably 0.010% or less.

At Least One Selected from Cu: 0.001% or More and 0.20% or Less and Ni: 0.001% or More and 0.10% or Less Cu and Ni enhance corrosion resistance under automotive service conditions. Furthermore, the corrosion product thereof covers the surface of the steel sheet and reduces the likelihood of hydrogen entering the steel sheet. In order to achieve the above advantageous effects, the Cu and Ni contents are each preferably 0.001% or more. The Cu and Ni contents are each more preferably 0.002% or more. However, if the Cu and Ni contents are excessively high, the occurrence of surface defects is induced and, consequently, coatability and ease of chemical conversion become degraded. Accordingly, the Cu content is preferably 0.20% or less. The Cu content is more preferably 0.15% or less and is further preferably 0.10% or less. The Ni content is preferably 0.10% or less. The Ni content is more preferably 0.08% or less and is further preferably 0.06% or less.

B: 0.0001% or More and Less Than 0.0020%

B is an element that enhances the hardenability of the steel. Addition of B enables the predetermined area fraction of martensite to be formed even in the case where the Mn content is low. In order to achieve the above advantageous effects of B, the B content is preferably 0.0001% or more. The B content is preferably 0.0002% or more and is further preferably 0.0003% or more. However, if the B content is 0.0020% or more, the rate at which cementite dissolves during annealing is reduced and, consequently, carbides including Fe as a principal constituent, such as cementite, may remain undissolved. In such a case, the residual stress generated at the transverse center of the steel sheet is increased and, consequently, delayed fracture resistance may become degraded. Accordingly, the B content is preferably less than 0.0020%. The B content is more preferably 0.0015% or less and is further preferably 0.0010% or less.

At Least One Selected from Sb: 0.002% or More and 0.1% or Less and Sn: 0.002% or More and 0.1% or Less Sb and Sn reduce the oxidation and nitriding of the surface-layer portion of the steel sheet and limit reductions in the C and B contents which may be caused by the oxidation and nitriding of the surface-layer portion. Furthermore, since reductions in the C and B contents are limited, the formation of ferrite in the surface-layer portion of the steel sheet is reduced. This contributes to an increase in strength. In order to achieve the above advantageous effects, the Sb and Sn contents are each preferably 0.002% or more. The Sb and Sn contents are each more preferably 0.003% or more and are each further preferably 0.004% or more. However, if any of the Sb and Sn contents exceeds 0.1%, Sb or Sn may segregate at prior-austenite grain boundaries. In such a case, the residual stress generated at the transverse center of the steel sheet is increased and, consequently, delayed fracture resistance may become degraded. Accordingly, the Sb and Sn contents are each preferably 0.1% or less. The Sb and Sn contents are each more preferably 0.08% or less and are each further preferably 0.06% or less.

The steel sheet according to the disclosed embodiments may include Ta, W, Ca, Mg, Zr, and REMs as another element such that the advantageous effects of the disclosed embodiments are not impaired. The allowable contents of the above elements are each 0.1% or less.

A method for producing the steel sheet according to the disclosed embodiments is described below.

The method for producing the steel sheet according to the disclosed embodiments includes a hot-rolling step, a cold-rolling step conducted as needed, and an annealing step. The method for producing the steel sheet according to the disclosed embodiments includes, for example, a hot-rolling step of heating a steel slab having the preferable chemical composition described above and hot-rolling the steel slab; a cold-rolling step conducted as needed; and an annealing step of holding a hot-rolled steel sheet prepared in the hot-rolling step or a cold-rolled steel sheet prepared in the cold-rolling step at an annealing temperature equal to or higher than the $A_{C1}$ temperature for 30 seconds or more, subsequently starting water quenching at a temperature equal to or higher than the Ms temperature, and, subsequent to water cooling to 100° C. or less, performing reheating to a temperature of 100° C. or more and 300° C. or less. While the water cooling is performed for the water quenching in the annealing step, the steel sheet is bound with two rollers arranged to abut onto the front and rear surfaces of the steel sheet so as to face each other across the steel sheet when the surface temperature of the steel sheet is equal to or lower than (Ms temperature+150° C.). The ratio of a binding pressure applied to the transverse center of the steel sheet to a binding pressure applied to the transverse end of the steel sheet at a position at which the steel sheet is bound with the two rollers is 1.05 or more and 2.0 or less.

Each of the above steps is described below. The term "temperature" used in the description of heating or cooling of a steel slab, a steel sheet, or the like refers to the surface temperature of the steel slab, the steel sheet, or the like unless otherwise specified.

Hot-Rolling Step

The hot-rolling step is a step of heating a steel slab having the above chemical composition and hot-rolling the steel slab.

A steel slab having the above-described chemical composition is subjected to hot rolling. The temperature at which the slab is heated is not limited. When the above slab-heating temperature is 1200° C. or more, dissolution of sulfide is facilitated and segregation of Mn is reduced. Consequently, the amounts of coarse inclusions and carbides, which are described above, can be reduced. This enhances delayed fracture resistance. Accordingly, the slab-heating temperature is preferably 1200° C. or more, is more preferably 1230° C. or more, and is further preferably 1250° C. or more. The upper limit for the slab-heating temperature is preferably, but not limited to, 1400° C. or less. The rate at which the slab is heated is preferably, but not limited to, 5 to 15° C./min. The amount of time during which the slab is soaked in the slab heating is preferably, but not limited to, 30 to 100 minutes.

The finishing-rolling temperature is preferably, but not limited to, 840° C. or more. If the finishing-rolling temperature is less than 840° C., the amount of time required for reducing the temperature is increased. This leads to the formation of inclusions and coarse carbides, which degrade delayed fracture resistance. Furthermore, the quality of the inside of the steel sheet may become degraded. Accordingly, the finishing-rolling temperature is preferably 840° C. or more. The finishing-rolling temperature is more preferably 860° C. or more. Although the upper limit for the finishing-rolling temperature is not set, the finishing-rolling temperature is preferably 950° C. or less because, otherwise, it becomes difficult to reduce the temperature to the subsequent coiling temperature. The finishing-rolling temperature is more preferably 920° C. or less.

It is preferable to coil the hot-rolled steel sheet, which has been cooled to the coiling temperature, at 630° C. or less. If the coiling temperature is higher than 630° C., decarbonization of the surface of the base iron may occur. In such a case, the inside and surface of the steel sheet may have different microstructures, which may result in inconsistencies in alloy concentration. Moreover, ferrite may be formed in the surface layer as a result of decarbonization. This may reduce tensile strength. Accordingly, the coiling temperature is preferably 630° C. or less and is more preferably 600° C. or less. Although the lower limit for the coiling temperature is not set, the coiling temperature is preferably 500° C. or more in order to prevent a reduction in ease of cold rolling.

Subsequent to coiling, the hot-rolled steel sheet may be optionally pickled. The pickling conditions are not limited.

Cold-Rolling Step

The cold-rolling step is a step of cold-rolling the hot-rolled steel sheet prepared in the hot-rolling step. The rolling reduction with which the cold rolling is performed is preferably, but not limited to, 20% or more because, if the rolling reduction is less than 20%, the degree of surface flatness may be reduced and the uniformity of microstructure may become degraded. Note that the cold-rolling step is not an essential step; the cold-rolling step may be omitted when the steel microstructure and mechanical properties fall within the ranges according to the disclosed embodiments.

Annealing Step

The annealing step is a step of holding the cold- or hot-rolled steel sheet at an annealing temperature equal to or higher than the $A_{C1}$ temperature for 30 seconds or more, subsequently starting water quenching at a temperature equal to or higher than a Ms temperature, and, subsequent to water cooling to 100° C. or less, performing reheating to a temperature of 100° C. or more and 300° C. or less. While the water cooling is performed for the water quenching in the annealing step, the steel sheet is bound with two rollers arranged to abut onto the front and rear surfaces of the steel sheet so as to face each other across the steel sheet when the surface temperature of the steel sheet is equal to or lower than (Ms temperature+150° C.). The ratio of a binding pressure applied to the transverse center of the steel sheet to a binding pressure applied to the transverse end of the steel sheet at a position at which the steel sheet is bound with the two rollers is 1.05 or more and 2.0 or less.

Heating to Annealing Temperature Equal to or Higher Than $A_{c1}$ Temperature

If the annealing temperature is lower than the $A_{C1}$ temperature, austenite cannot be formed. In such a case, it becomes difficult to produce a steel sheet including 20% or more martensite, that is, the intended strength may fail to be achieved. Accordingly, the annealing temperature needs to be equal to or higher than the $A_{C1}$ temperature and is preferably equal to or higher than ($A_{C1}$ temperature+10° C.) Although the upper limit for the annealing temperature is not set, the annealing temperature is preferably 900° C. or less in order to optimize the temperature at which water quenching is performed and prevent the degradation of shape uniformity.

The above $A_{C1}$ temperature is calculated using the formula below. In the following formula, "(% symbol of element)" refers to the content (mass %) of the element.

$$A_{C1} \text{ temperature (° C.)} = 723 + 22(\% \text{ Si}) - 18(\% \text{ Mn}) + 17(\% \text{ Cr}) + 4.5(\% \text{ Mo}) + 16(\% \text{ V})$$

Amount of Time (Annealing Holding Time) During which Holding is Performed at Annealing Temperature is 30 Seconds or More If the above annealing holding time is less than 30 seconds, the dissolution of carbides and austenite transformation fail to be performed to sufficient degrees. In such a case, coarsening of the remaining carbides may occur in the subsequent heat treatment. This increases the residual stress generated at the transverse center of the steel sheet and consequently degrades delayed fracture resistance. Accordingly, the annealing holding time is limited to be 30 seconds or more and is preferably 35 seconds or more. Although the upper limit for the annealing holding time is not set, the annealing holding time is preferably 900 seconds or less in order to prevent an excessive increase in the diameter of austenite grains and limit an increase in the amount of hydrogen entry.

Water Quenching Start Temperature is Equal to or Higher than Ms Temperature

The temperature at which quenching is started is an important factor that determines martensite volume fraction, which is a factor that controls strength. If the above quenching start temperature is lower than the Ms temperature, martensite transformation occurs before quenching. In such a case, self-tempering of martensite occurs and shape uniformity becomes degraded consequently. Accordingly, the water quenching start temperature is limited to be equal to or higher than the Ms temperature and is preferably equal to or higher than (Ms temperature+50° C.). The upper limit for the water quenching start temperature is not set; the water quenching start temperature may be equal to the annealing temperature.

The above Ms temperature is calculated using the formula below. In the following formula, "(% symbol of element)" refers to the content (mass %) of the element, and "(% $V_M$)" refers to the area ratio of martensite phase (unit: %).

$$Ms \text{ temperature } (°C.)=550-350\{(\% \text{ C})/(\% V_M)\times 100\}-40(\% \text{ Mn})-17(\% \text{ Ni})-17(\% \text{ Cr})-21(\% \text{ Mo})$$

Binding the steel sheet with two rollers arranged to abut onto the front and rear surfaces of the steel sheet while the water cooling is performed for the water quenching is an important factor for producing a shape correction effect. Controlling the binding conditions is an important factor for reducing the residual stress generated at the transverse center of the steel sheet and fluctuations in residual stress over the steel sheet full-width. One of the characteristics of the disclosed embodiments is enhancing the shape uniformity of the steel sheet as a result of correcting the transformation strain that occurs during water cooling by binding the steel sheet while eliminating a need to perform correction by leveler correction or skin pass rolling, which increase residual stress and degrade delayed fracture resistance. Since a need to perform leveler forming or skin pass rolling, which is performed for addressing the degradation of shape uniformity, is eliminated, it becomes possible to reduce residual stress. In addition, since fluctuations in residual stress over the steel sheet full-width can be reduced depending on the binding conditions, delayed fracture resistance can be enhanced over the steel sheet full-width.

Surface Temperature of Steel Sheet at which Steel Sheet is Bound with Two Rollers Arranged to Abut onto Front and Rear Surfaces of Steel Sheet (Hereinafter, this Temperature is Referred to as "Binding Temperature") is Equal to or Lower than (Ms Temperature+150° C.)

If the above binding temperature exceeds (Ms temperature+150° C.), martensite transformation occurs after the steel sheet has been bound. In such a case, it becomes impossible to limit the degradation of shape uniformity which is caused by transformation expansion of martensite transformation and, consequently, shape uniformity becomes degraded. Accordingly, the binding temperature is limited to be equal to or lower than (Ms temperature+150° C.), is preferably equal to or lower than (Ms temperature+100° C.), and is more preferably equal to or lower than (Ms temperature+50° C.). Although the lower limit for the binding temperature is not set, the binding temperature is preferably 0° C. or more, at which water does not freeze.

Ratio of Binding Pressure Applied to Transverse Center of Steel Sheet to Binding Pressure Applied to Transverse End of Steel Sheet at Position at which Steel Sheet is Bound with Two Rollers is 1.05 or More and 2.0 or Less When the ratio of a binding pressure applied to the transverse center of the steel sheet to a binding pressure applied to the transverse end of the steel sheet at a position at which the steel sheet is bound with the two rollers is limited to be 1.05 or more, the residual stress that remains at the transverse center of the steel sheet can be dissipated in the transverse direction of the steel sheet. This reduces the residual stress generated at the transverse center of the steel sheet and fluctuations in residual stress over the steel sheet full-width and enhances delayed fracture resistance to an excellent level over the steel sheet full-width. Accordingly, the above binding pressure ratio is limited to be 1.05 or more. The binding pressure ratio is preferably 1.10 or more. However, if the binding pressure ratio exceeds 2.0, the residual stress generated at the transverse center of the steel sheet is increased and, consequently, delayed fracture resistance becomes degraded. Accordingly, the binding pressure ratio is limited to be 2.0 or less. The binding pressure ratio is preferably 1.7 or less and is more preferably 1.5 or less.

Although the binding pressure ratio needs to fall within the range according to the disclosed embodiments, the binding pressure is not limited. In order to achieve the advantageous effects of the disclosed embodiments with further effect, the binding pressure (load) per square millimeter of the steel sheet is preferably 50 to 300 N/mm². Note that the above binding pressure (load) is the total of the pressures applied from the front and rear surfaces of the steel sheet to the steel sheet. It is preferable that the binding pressure applied with the two rollers be applied from the front and rear surfaces of the steel sheet in a uniform manner.

The means for binding the steel sheet while applying a higher pressure to the transverse center than to the transverse end is not limited.

Examples of such means include adjusting the diameter of a portion of each roller which comes into contact with the transverse center of the steel sheet when the steel sheet is bound with the rollers to be larger than the diameter of a portion of the roller which comes into contact with the transverse end. For example, using rollers having a length larger than the width of the steel sheet, the diameter of a portion of each roller which comes into contact with the transverse center being equal to that of a portion of the roller which comes into contact with the transverse end, and adjusting the temperature of the transverse center to be higher than the temperature of the transverse end enable the diameters of the portions of the rollers which come into contact with the transverse center to be larger due to the difference in coefficient of thermal expansion. The use of the above-described rollers enables the binding pressure to be applied to the steel sheet in a consistent manner. For another example, rollers prepared such that the diameter of a portion of each roller which comes into contact with the transverse center to be larger than the diameter of a portion of the roller which comes into contact with the transverse end may be used while the temperature of the transverse center is adjusted to be equal to the temperature of the transverse end.

Another example of the above means is dividing guide rollers that press the rollers, which come into direct contact with the steel sheet, against the steel sheet into portions corresponding to the transverse center and transverse end of the steel sheet and adjusting the force with which the rollers are pressed by the guide rollers at the transverse center to be larger than the force with which the rollers are pressed by the guide rollers at the transverse end.

Water Cooling is Performed to 100° C. or Less

If the temperature subsequent to water cooling exceeds 100° C., martensite transformation occurs subsequent to water cooling to a degree at which shape uniformity is adversely affected. Accordingly, the temperature of the steel sheet that has been delivered from the water tank needs to be 100° C. or less. The temperature subsequent to water cooling is preferably 80° C. or less.

Reheating is Performed at 100° C. or More and 300° C. or Less

Subsequent to water cooling, reheating is performed in order to temper martensite formed during water cooling. This reduces residual stress and thereby enhances delayed fracture resistance. If the reheating temperature is lower than 100° C., the above advantageous effects cannot be achieved. Accordingly, the reheating temperature is limited to be 100° C. or more. The reheating temperature is preferably 130° C. or more. If tempering is performed at a temperature higher than 300° C., shape uniformity becomes degraded due to transformation contraction caused by tempering. Thus, the reheating temperature is limited to be 300° C. or less. The reheating temperature is preferably 260° C. or less.

The hot-rolled steel sheet prepared in the hot-rolling step may optionally be subjected to a heat treatment for softening of microstructure. Subsequent to the annealing step, temper rolling may optionally be performed for shape adjustment. A plating process may optionally be performed to deposit a plating layer composed of Zn, Al, or the like on the surface of the steel sheet.

Assuming that the transverse ends of the steel sheet are removed by trimming in the production of the steel sheet, the transverse center of the steel sheet according to the disclosed embodiments may be ±200 mm from the position of ½ of the width of the steel sheet in the transverse direction.

A member according to the disclosed embodiments and a method for producing the member are described below.

The member according to the disclosed embodiments is produced by subjecting the steel sheet according to the disclosed embodiments to at least one of a forming process contact thermometer accompanying the rollers. The binding pressure was calculated by CAE (computer aided engineering) analysis using a YU model on the basis of the stiffness and shape of the rollers, the length of penetration, the thickness of the steel sheet, austenite volume fraction in transformation, and a stress-strain curve.

In the water quenching performed in the annealing step, a binding pressure (load) was applied to the steel sheet with two rollers, which were arranged to abut onto the front and rear surfaces of the steel sheet so as to face each other across the steel sheet, at a uniform pressure such that the binding pressure (load) per square millimeter of the rolled steel sheet was 50 to 300 N/mm$^2$.

In No. 2 of Table 1, since the steel sheet was not bound with two rollers while water cooling was performed for water quenching in the annealing step, "Surface temperature of steel sheet bound with rollers" and "Ratio of binding pressure applied to transverse center of steel sheet to binding pressure applied to transverse end of steel sheet at position at which steel sheet was bound with rollers" are denoted as "-".

TABLE 1

| | | | Annealing conditions | | | | | | | |
|---|---|---|---|---|---|---|---|---|---|---|
| No. | Cold rolling Rolling reduction % | Thickness mm | Annealing temperature ° C. | Annealing holding time sec | Water quenching start temperature ° C. | *1 ° C. | *2 % | Water cooling stop temperature ° C. | Reheating temperature ° C. | Remark |
| 1 | 56 | 1.4 | 860 | 60 | 775 | 300 | 1.20 | 50 | 150 | Example |
| 2 | 56 | 1.4 | 860 | 60 | 782 | — | — | 50 | 150 | Comparative example |
| 3 | 56 | 1.4 | 860 | 60 | 780 | 300 | 1.20 | 50 | 70 | Comparative example |

*1: Surface temperature of steel sheet bound with rollers
*2: Ratio of binding pressure applied to transverse center of steel sheet to binding pressure applied to transverse end of steel sheet at position at which steel sheet was bound with rollers (binding pressure at transverse center/binding pressure at transverse end)

and welding. The method for producing the member according to the disclosed embodiments includes a step of subjecting a steel sheet produced by the method for producing a steel sheet according to the disclosed embodiments to at least one of a forming process and welding.

The steel sheet according to the disclosed embodiments has a high strength, excellent shape uniformity, and excellent delayed fracture resistance. Since a member produced using the steel sheet according to the disclosed embodiments has a high strength, suitable dimensional accuracy, and excellent delayed fracture resistance, it can be suitably used as, for example, an automotive structural member.

As the forming process, common working methods, such as press forming, may be used without limitation. As welding, common welding processes, such as spot welding and arc welding, may be used without limitation.

EXAMPLES

Example 1

The disclosed embodiments are specifically described with reference to Examples below.
1. Production of Evaluation Steel Sheets
Cold-rolled steel sheets having a thickness of 1.4 mm were annealed under the conditions described in Table 1 to produce steel sheets having the properties described in Table 2. The temperature of the steel sheet at which the steel sheet was passed through the binding rollers was measured with a 2. Evaluation Methods The steel microstructure of each of the steel sheets prepared under the above various production conditions was analyzed in order to determine the fraction of each microstructure component. The steel sheets were subjected to a tensile test in order to determine tensile properties such as tensile strength. The steel sheets were subjected to a delayed fracture test in order to determine delayed fracture resistance. The shape of each of the steel sheets was measured in order to determine shape uniformity. The methods used in the above evaluations are as follows. Table 2 lists the results.
(Area Fractions of Steel Microstructure Components)

A test specimen was taken from each of the steel sheets in the rolling direction and a direction perpendicular to the rolling direction. A thickness-L cross section of the test specimen which was taken so as to be parallel to the rolling direction was mirror-polished and treated with a nital solution in order to expose microstructure. The sample on which microstructure was exposed was inspected with a scanning electron microscope. In a SEM image taken with a 1500-fold magnification, a 16×15 lattice with intervals of 4.8 μm was placed on a region having a true size of 82 μm×57 μm, and the area fractions of martensite and ferrite were determined by counting the numbers of points located on the respective phases, that is, by the point counting. The average of three area fractions of each phase which were determined from different SEM images taken with a 1500-fold magnification was used as an area fraction of the phase. The above measurement was conducted at a position of ¼ of the thickness of the steel sheet. Martensite appears as a white microstructure. Tempered-martensite includes fine carbide grains precipitated inside the tempered-martensite phase. Ferrite appears as a black microstructure. The internal carbide grains may be difficult to appear depending on the plane orientation of block grains and the degree of etching. In such a case, confirmation needs to be made after etching has been performed to a sufficient degree. The area fraction of the component other than ferrite or martensite, that is, the balance, was calculated by subtracting the total area fraction of ferrite and martensite from 100%.

(Tensile Test)

A JIS No. 5 test specimen having a gauge length of 50 mm and a gauge width of 25 mm was taken from the transverse center of each of the steel sheets in the rolling direction. Then, a tensile test was conducted at a cross head speed of 10 mm/min in accordance with JIS Z 2241(2011) in order to measure a tensile strength (TS) and a yield strength (YS).

(Method for Measuring Residual Stress)

A residual stress was measured by X-ray diffraction. Specifically, a sample having a length of 100 mm in the rolling direction and a length of 30 mm in the transverse direction was taken from the transverse center and transverse end of each of the steel sheets. The sample of each steel sheet was placed on a die having an angle of 90°. The steel sheet was pressed with a punch having an angle of 90° such that the direction of the bending ridge line was parallel to the transverse direction of the steel sheet, in order to perform a V-bending process. The V-bending process was performed under the conditions of punch moving speed: 30 ram/min, load: 15 ton, and holding time at maximum load (penetration time): 5 sec. Subsequently, the steel sheet (member) that had been subjected to the bending process was fastened using bolts, nuts, and tapered washers from both surfaces of the steel sheet with bolts. The amount of fastening was set to 30 mm.

The position at which a residual stress of the steel sheet that had been subjected to the bending process was measured was the thickness center of the end surface of the bending ridge line portion. The diameter of irradiation of X-ray was 150 μm. The measurement direction was set to a direction perpendicular to the thickness direction and the direction of the bending ridge line.

The sample of the transverse end of each steel sheet was taken at a position 0 to 30 mm from the transverse end of the steel sheet in the transverse direction.

In Examples, each of the steel sheets was produced while a load was applied to the steel sheet so as to be symmetric about the transverse center of the steel sheet in the transverse direction. Therefore, the residual stress at only one of the ends of each steel sheet was measured; the residual stress at the other end of the steel sheet was considered equal to the above residual stress.

(Measurement of Critical Load Stress)

A critical load stress was measured by a delayed fracture test. Specifically, a sample having a length of 100 mm in the rolling direction and a length of 30 mm in the transverse direction was taken from the transverse center of each of the steel sheets. The sample was subjected to a V-bending process as in the measurement of residual stress. Subsequently, the steel sheet (member) that had been subjected to the bending process was fastened using bolts, nuts, and tapered washers from both surfaces of the steel sheet with bolts. The relationship between load stress and the amount of fastening was calculated on the basis of a stress-strain curve determined by a tensile test by CAE analysis using a YU model. Thus, forming members having various load stresses were prepared. The forming members were immersed in hydrochloric acid having a pH of 1 (25° C.) The maximum load stress at which delayed fracture did not occur was determined as a critical load stress. The occurrence of delayed fracture was determined visually or by inspecting an image magnified by 20 times with a stereomicroscope. When cracking did not occur even after immersion of 96 hours, it was considered that fracture did not occur. Note that the term "cracking" used herein refers to the case where a crack having a length of 200 μm or more was formed.

(Measurement of Shape of Steel Sheet)

Each of the steel sheets prepared in Examples was sheared to a size having the same width as the steel sheet and a length of 1 m in the longitudinal direction (the rolling direction) of the steel sheet. The sheared steel sheet was placed on a horizontal stage. Note that the sheared steel sheet was placed on the horizontal stage such that the number of contact points at which the corners of the steel sheet and the horizontal stage came into contact with each other was maximized (two or more). The amount of warpage was determined by lowering a horizontal plate from a position above the steel sheet until it came into contact with the steel sheet and subtracting the thickness of the steel sheet from the distance between the horizontal stage and the horizontal plate at the position at which the horizontal plate was in contact with the steel sheet. The maximum amount of warpage was the maximum between the amount of warpage measured with one of the surfaces of the steel sheet facing upward and the amount of warpage measured with the other surface of the steel sheet facing upward. The clearance of a blade of the shearing machine used for cutting the steel sheet in the longitudinal direction was 4% (the upper limit for the control range was 10%).

3. Evaluation Results

Table 2 lists the evaluation results.

TABLE 2

| No. | Microstructure | | | Residual stress | | Tensile properties | | Delayed fracture resistance | | Shape | Remark |
| | M % | F % | Balance % | Transverse center MPa | *1 % | YS MPa | TS MPa | Critical load stress MPa | *2 % | *3 mm | |
| --- | --- | --- | --- | --- | --- | --- | --- | --- | --- | --- | --- |
| 1 | 97 | 2 | 1 | 350 | 104 | 1257 | 1535 | 1470 | 105 | 6 | Example |
| 2 | 97 | 1 | 2 | 1020 | 88 | 1238 | 1522 | 1120 | 86 | 28 | Comparative example |

TABLE 2-continued

| | Microstructure | | | Residual stress Transverse | | Tensile properties | | Delayed fracture resistance Critical | | Shape | |
|---|---|---|---|---|---|---|---|---|---|---|---|
| No. | M % | F % | Balance % | center MPa | *1 % | YS MPa | TS MPa | load stress MPa | *2 % | *3 mm | Remark |
| 3 | 98 | 1 | 1 | 990 | 105 | 1263 | 1542 | 1210 | 104 | 11 | Comparative example |

M: Area fraction of martensite,
F: Area fraction of ferrite,
Balance: Area fraction of balance
*1: Ratio of residual stress at transverse end to residual stress at transverse center (residual stress at transverse end/residual stress at transverse center)
*2: Ratio of critical load stress at transverse end to critical load stress at transverse center (critical load stress at transverse end/critical load stress at transverse center)
*3: Maximum amount of warpage of steel sheet sheared to length of 1 m in longitudinal direction In Examples above, steel sheets having a TS of 750 MPa or more and a critical load stress of equal to or higher than YS, wherein the ratio of critical load stress at the transverse center of the steel sheet to critical load stress at the transverse end of the steel sheet was 90% or more and 110% or less and the maximum amount of warpage of the steel sheet sheared to a length of 1 m in the longitudinal direction was 15 mm or less, were evaluated as "passed" and denoted as "Example" in Table 2. Steel sheets that did not satisfy at least one of the above conditions were evaluated as "Failed" and denoted as "Comparative example" in Table 2.

Example 2

The disclosed embodiments are specifically described with reference to Examples below.
1. Production of Evaluation Steel Sheets Each of the steels having the chemical compositions described in Table 3 with the balance being Fe and incidental impurities was formed into a molten steel in a vacuum melting furnace and then subjected to blooming rolling to prepare a blooming-rolled material having a thickness of 27 mm. The blooming-rolled material was hot-rolled. As for samples that were to be cold-rolled, the hot-rolled steel sheet was ground and then cold-rolled at a specific one of the rolling reductions described in Tables 4 and 5 to a specific one of the thicknesses described in Tables 4 and 5 to prepare a cold-rolled steel sheet. As for some of the samples, cold rolling was not performed subsequent to the grinding of the hot-rolled steel sheet. The symbol "-" in the column "Rolling reduction" of the table means that the sample was not cold-rolled. Subsequently, the hot- and cold-rolled steel sheets prepared as described above were annealed under the conditions described in Tables 4 and 5 to produce steel sheets. The blanks in Table 3 mean that the constituents were not added to steel intentionally, that is, the steel did not contain the constituents (0 mass %) or the steel contains the constituents incidentally.

In Tables 4 and 5, as for Comparative examples, "Surface temperature of steel sheet bound with rollers" and "Ratio of binding pressure applied to transverse center of steel sheet to binding pressure applied to transverse end of steel sheet at position at which steel sheet was bound with rollers" are denoted as "-". This means that the steel sheet was not bound with two rollers while water cooling was performed for water quenching in the annealing step.

TABLE 3

| Steel type | Chemical composition (mass %) | | | | | | | | | | | | | | | | | $A_{C1}$ temperature (° C.) |
|---|---|---|---|---|---|---|---|---|---|---|---|---|---|---|---|---|---|---|
| | C | Si | Mn | P | S | Al | N | B | Nb | Ti | Cu | Ni | Cr | Mo | V | Sb | Sn | |
| A | 0.06 | 1.00 | 2.20 | 0.007 | 0.0008 | 0.051 | 0.0021 | | | | | | | | | | | 705 |
| B | 0.18 | 0.90 | 0.20 | 0.008 | 0.0003 | 0.068 | 0.0048 | | | | | | | | | | | 739 |
| C | 0.14 | 1.40 | 2.40 | 0.008 | 0.0050 | 0.080 | 0.0021 | | | | | | | | | | | 711 |
| D | 0.22 | 0.40 | 1.50 | 0.018 | 0.0002 | 0.021 | 0.0043 | | | | | | | | | | | 705 |
| E | 0.26 | 0.20 | 1.00 | 0.010 | 0.0010 | 0.077 | 0.0043 | | | | | | | | | | | 709 |
| F | 0.28 | 1.40 | 1.50 | 0.010 | 0.0010 | 0.049 | 0.0058 | | | | | | | | | | | 727 |
| G | 0.22 | 1.50 | 2.80 | 0.007 | 0.0004 | 0.005 | 0.0014 | | | | | | | | | | | 706 |
| H | 0.42 | 1.40 | 0.80 | 0.007 | 0.0010 | 0.078 | 0.0034 | | | | | | | | | | | 739 |
| I | 0.54 | 0.12 | 0.25 | 0.006 | 0.0007 | 0.096 | 0.0046 | | | | | | | | | | | 721 |
| J | 0.28 | 1.60 | 1.40 | 0.025 | 0.0002 | 0.092 | 0.0100 | | | | | | | | | | | 733 |
| K | 0.27 | 1.80 | 1.60 | 0.009 | 0.0009 | 0.026 | 0.0031 | | | | | | | | | | | 734 |
| L | 0.15 | 0.01 | 2.90 | 0.016 | 0.0004 | 0.039 | 0.0028 | | | | | | | | | | | 671 |
| M | 0.14 | 0.07 | 3.10 | 0.005 | 0.0004 | 0.050 | 0.0015 | | | | | | | | | | | 669 |
| N | 0.26 | 0.90 | 1.50 | 0.006 | 0.0010 | 0.066 | 0.0053 | | | | | | 0.05 | | | | | 717 |
| O | 0.24 | 0.80 | 1.70 | 0.038 | 0.0006 | 0.051 | 0.0040 | | | | | | | 0.04 | | | | 710 |
| P | 0.28 | 0.40 | 0.90 | 0.006 | 0.0002 | 0.062 | 0.0027 | | | | | | | 0.04 | 0.08 | 0.005 | | 717 |
| Q | 0.32 | 0.05 | 0.60 | 0.009 | 0.0002 | 0.063 | 0.0051 | | 0.0060 | 0.004 | | | | | | | | 713 |
| R | 0.15 | 1.20 | 2.40 | 0.007 | 0.0004 | 0.038 | 0.0051 | | | | 0.01 | 0.004 | | | | | | 706 |
| S | 0.18 | 1.40 | 2.30 | 0.006 | 0.0003 | 0.040 | 0.0037 | 0.0007 | | | | | | | | | | 712 |
| T | 0.24 | 1.30 | 2.10 | 0.017 | 0.0005 | 0.034 | 0.0019 | | | | | | | | 0.008 | | 0.005 | 714 |
| U | 0.63 | 1.10 | 1.20 | 0.019 | 0.0002 | 0.035 | 0.0021 | | | | | | | | | | | 726 |
| V | 0.04 | 1.20 | 1.20 | 0.006 | 0.0002 | 0.077 | 0.0055 | | | | | | | | | | | 728 |

TABLE 3-continued

| Steel type | Chemical composition (mass %) | | | | | | | | | | | | | | | | | $A_{C1}$ temperature (° C.) |
|---|---|---|---|---|---|---|---|---|---|---|---|---|---|---|---|---|---|---|
| | C | Si | Mn | P | S | Al | N | B | Nb | Ti | Cu | Ni | Cr | Mo | V | Sb | Sn | |
| W | 0.21 | 2.40 | 1.05 | 0.008 | 0.0010 | 0.023 | 0.0028 | | | | | | | | | | | 757 |
| X | 0.22 | 0.12 | 3.40 | 0.026 | 0.0006 | 0.069 | 0.0024 | | | | | | | | | | | 664 |
| Y | 0.22 | 0.16 | 0.04 | 0.008 | 0.0007 | 0.059 | 0.0010 | | | | | | | | | | | 726 |
| Z | 0.28 | 0.84 | 1.20 | 0.070 | 0.0004 | 0.069 | 0.0058 | | | | | | | | | | | 720 |
| AA | 0.26 | 0.07 | 1.32 | 0.007 | 0.0080 | 0.059 | 0.0028 | | | | | | | | | | | 701 |
| AB | 0.25 | 0.11 | 1.31 | 0.006 | 0.0003 | 0.150 | 0.0021 | | | | | | | | | | | 702 |
| AC | 0.21 | 0.05 | 1.28 | 0.018 | 0.0008 | 0.071 | 0.0150 | | | | | | | | | | | 701 |

TABLE 4

| No. | Steel type | Annealing conditions | | | | | | | | Remark |
|---|---|---|---|---|---|---|---|---|---|---|
| | | Cold rolling Rolling reduction % | Thickness mm | Annealing temperature ° C. | Annealing holding time sec | Water quenching start temperature ° C. | *1 ° C. | *2 % | Water cooling stop temperature ° C. | Reheating temperature ° C. | |
| 1 | A | 56 | 1.4 | 760 | 60 | 731 | 300 | 1.08 | 50 | 150 | Example |
| 2 | | 56 | 1.4 | 760 | 60 | 701 | 300 | 1.20 | 50 | 150 | Example |
| 3 | | 56 | 1.4 | 760 | 60 | 709 | — | — | 50 | 150 | Comparative example |
| 4 | | 56 | 1.4 | 760 | 60 | 745 | 300 | 1.20 | 50 | 150 | Example |
| 5 | B | 56 | 1.4 | 800 | 60 | 717 | 300 | 1.07 | 50 | 150 | Example |
| 6 | | 56 | 1.4 | 800 | 60 | 790 | 300 | 1.02 | 50 | 150 | Comparative example |
| 7 | | 56 | 1.4 | 800 | 60 | 787 | 300 | 1.11 | 50 | 150 | Example |
| 8 | | 56 | 1.4 | 800 | 60 | 761 | 300 | 1.12 | 50 | 150 | Example |
| 9 | C | 56 | 1.4 | 820 | 60 | 810 | 300 | 2.10 | 50 | 150 | Comparative example |
| 10 | | 56 | 1.4 | 820 | 60 | 818 | 300 | 1.80 | 50 | 150 | Example |
| 11 | | 56 | 1.4 | 820 | 60 | 814 | 300 | 1.60 | 50 | 150 | Example |
| 12 | | 56 | 1.4 | 820 | 60 | 767 | 300 | 1.30 | 50 | 150 | Example |
| 13 | D | 56 | 1.4 | 872 | 60 | 827 | 300 | 1.02 | 50 | 150 | Comparative example |
| 14 | | 56 | 1.4 | 880 | 60 | 819 | 300 | 1.08 | 50 | 150 | Example |
| 15 | | 56 | 1.4 | 884 | 60 | 779 | 300 | 1.20 | 50 | 150 | Example |
| 16 | | 56 | 1.4 | 898 | 60 | 803 | 300 | 2.20 | 50 | 150 | Comparative example |
| 17 | E | 56 | 1.4 | 867 | 60 | 731 | 580 | 1.30 | 50 | 150 | Comparative example |
| 18 | | 56 | 1.4 | 883 | 60 | 860 | 400 | 1.10 | 50 | 150 | Example |
| 19 | | 56 | 1.4 | 899 | 60 | 714 | 300 | 1.20 | 50 | 150 | Example |
| 20 | | 56 | 1.4 | 888 | 60 | 738 | 150 | 1.30 | 50 | 150 | Example |
| 21 | F | 56 | 1.4 | 894 | 60 | 806 | 550 | 1.30 | 50 | 150 | Comparative example |
| 22 | | 56 | 1.4 | 882 | 60 | 835 | 400 | 1.30 | 50 | 150 | Example |
| 23 | | 56 | 1.4 | 882 | 60 | 835 | 300 | 1.30 | 50 | 150 | Example |
| 24 | | 56 | 1.4 | 890 | 60 | 830 | 150 | 1.30 | 50 | 150 | Example |
| 25 | G | 56 | 1.4 | 895 | 60 | 807 | 520 | 1.30 | 50 | 150 | Comparative example |
| 26 | | 56 | 1.4 | 885 | 60 | 763 | 410 | 1.30 | 50 | 150 | Example |
| 27 | | 56 | 1.4 | 885 | 60 | 763 | 150 | 1.30 | 50 | 150 | Example |
| 28 | | 56 | 1.4 | 882 | 60 | 758 | 50 | 1.30 | 50 | 150 | Example |
| 29 | H | — | 3.2 | 815 | 60 | 733 | 300 | 1.30 | 50 | 150 | Example |
| 30 | | 40 | 1.9 | 850 | 60 | 772 | 300 | 1.30 | 50 | 150 | Example |
| 31 | | 80 | 0.6 | 870 | 60 | 829 | 300 | 1.30 | 50 | 150 | Example |
| 33 | I | 56 | 1.4 | 770 | 60 | 741 | 80 | 1.10 | 50 | 150 | Example |
| 35 | J | 56 | 1.4 | 890 | 60 | 730 | 300 | 1.10 | 50 | 150 | Example |
| 36 | | 56 | 1.4 | 880 | 20 | 799 | 300 | 1.10 | 50 | 150 | Comparative example |
| 37 | | 56 | 1.4 | 889 | 360 | 767 | 300 | 1.10 | 50 | 150 | Example |
| 38 | K | 56 | 1.4 | 879 | 60 | 755 | 300 | 1.20 | 50 | 150 | Example |
| 39 | | 56 | 1.4 | 886 | 60 | 550 | 300 | 1.20 | 50 | 150 | Example |
| 40 | | 56 | 1.4 | 870 | 60 | 350 | 300 | 1.20 | 50 | 150 | Comparative example |
| 41 | L | 56 | 1.4 | 863 | 60 | 650 | 300 | 1.20 | 50 | 150 | Example |
| 42 | | 56 | 1.4 | 861 | 60 | 340 | 300 | 1.20 | 50 | 150 | Comparative example |
| 43 | | 56 | 1.4 | 873 | 60 | 450 | 300 | 1.20 | 50 | 150 | Example |
| 44 | M | 56 | 1.4 | 891 | 60 | 702 | 300 | 1.20 | 80 | 150 | Example |

TABLE 4-continued

|  |  |  | Annealing conditions | | | | | | |  |
|---|---|---|---|---|---|---|---|---|---|---|
| No. | Steel type | Cold rolling Rolling reduction % | Thickness mm | Annealing temperature ° C. | Annealing holding time sec | Water quenching start temperature ° C. | *1 ° C. | *2 % | Water cooling stop temperature ° C. | Reheating temperature ° C. | Remark |
| 45 |  | 56 | 1.4 | 875 | 60 | 727 | 300 | 1.20 | 50 | 150 | Example |
| 46 |  | 56 | 1.4 | 878 | 60 | 635 | 300 | 1.20 | 150 | 150 | Comparative example |

*1: Surface temperature of steel sheet bound with rollers
*2: Ratio of binding pressure applied to transverse center of steel sheet to binding pressure applied to transverse end of steel sheet at position at which steel sheet was bound with rollers (binding pressure at transverse center/binding pressure at transverse end)

TABLE 5

|  |  |  | Annealing conditions | | | | | | |  |
|---|---|---|---|---|---|---|---|---|---|---|
| No. | Steel type | Cold rolling Rolling reduction % | Thickness mm | Annealing temperature ° C. | Annealing holding time sec | Water quenching start temperature ° C. | *1 ° C. | *2 % | Water cooling stop temperature ° C. | Reheating temperature ° C. | Remark |
| 47 | N | 56 | 1.4 | 876 | 60 | 757 | 300 | 1.40 | 50 | 150 | Example |
| 48 |  | 56 | 1.4 | 895 | 60 | 824 | — | — | 50 | 200 | Comparative example |
| 49 |  | 56 | 1.4 | 895 | 60 | 824 | 300 | 1.40 | 50 | 250 | Example |
| 50 |  | 56 | 1.4 | 884 | 60 | 754 | 300 | 1.40 | 50 | 320 | Comparative example |
| 51 | O | 56 | 1.4 | 881 | 60 | 694 | 300 | 1.05 | 50 | 80 | Comparative example |
| 52 |  | 56 | 1.4 | 877 | 60 | 877 | 300 | 1.06 | 50 | 180 | Example |
| 53 |  | 56 | 1.4 | 877 | 60 | 877 | 300 | 1.06 | 50 | 320 | Comparative example |
| 54 |  | 56 | 1.4 | 876 | 60 | 793 | 300 | 1.05 | 50 | 100 | Example |
| 55 | P | 56 | 1.4 | 863 | 20 | 753 | 300 | 1.05 | 50 | 150 | Comparative example |
| 56 |  | 56 | 1.4 | 877 | 32 | 848 | 300 | 1.05 | 50 | 150 | Example |
| 57 |  | 56 | 1.4 | 877 | 240 | 848 | 300 | 1.06 | 50 | 150 | Example |
| 58 |  | 56 | 1.4 | 871 | 600 | 766 | 300 | 1.06 | 50 | 150 | Example |
| 59 | Q | 56 | 1.4 | 872 | 60 | 845 | 560 | 1.05 | 50 | 150 | Comparative example |
| 60 |  | 56 | 1.4 | 871 | 60 | 788 | 400 | 1.06 | 50 | 150 | Example |
| 61 |  | 56 | 1.4 | 871 | 60 | 788 | 200 | 1.05 | 50 | 150 | Example |
| 62 |  | 56 | 1.4 | 892 | 60 | 783 | 50 | 1.05 | 50 | 150 | Example |
| 63 | R | 56 | 1.4 | 890 | 60 | 882 | 300 | 1.03 | 50 | 150 | Comparative example |
| 64 |  | 56 | 1.4 | 881 | 60 | 875 | 300 | 1.07 | 50 | 150 | Example |
| 65 |  | 56 | 1.4 | 881 | 60 | 875 | 300 | 1.30 | 50 | 150 | Example |
| 66 |  | 56 | 1.4 | 860 | 60 | 684 | 300 | 2.30 | 50 | 150 | Comparative example |
| 67 | S | 56 | 1.4 | 877 | 60 | 705 | 300 | 1.80 | 50 | 150 | Example |
| 68 |  | 56 | 1.4 | 898 | 60 | 755 | 300 | 1.50 | 50 | 150 | Example |
| 69 |  | 56 | 1.4 | 898 | 60 | 755 | 300 | 1.07 | 50 | 150 | Example |
| 70 |  | 56 | 1.4 | 894 | 60 | 702 | 300 | 1.40 | 50 | 150 | Example |
| 71 | T | 56 | 1.4 | 898 | 60 | 880 | 500 | 1.40 | 50 | 150 | Example |
| 72 |  | 56 | 1.4 | 869 | 60 | 743 | 350 | 1.40 | 50 | 150 | Example |
| 73 |  | 56 | 1.4 | 869 | 60 | 743 | 50 | 1.40 | 50 | 150 | Example |
| 74 |  | 56 | 1.4 | 899 | 60 | 686 | 560 | 1.40 | 50 | 150 | Comparative example |
| 75 | U | 56 | 1.4 | 898 | 60 | 896 | 80 | 1.40 | 50 | 150 | Comparative example |
| 76 | V | 56 | 1.4 | 886 | 60 | 700 | 300 | 1.40 | 50 | 150 | Comparative example |
| 77 | W | 56 | 1.4 | 890 | 60 | 838 | 300 | 1.40 | 50 | 150 | Comparative example |
| 78 | X | 56 | 1.4 | 893 | 60 | 740 | 300 | 1.40 | 50 | 150 | Comparative example |
| 79 | Y | 56 | 1.4 | 895 | 60 | 804 | 80 | 1.40 | 50 | 150 | Comparative example |
| 80 | Z | 56 | 1.4 | 898 | 60 | 831 | 300 | 1.40 | 50 | 150 | Comparative example |
| 81 | AA | 56 | 1.4 | 890 | 60 | 807 | 300 | 1.40 | 50 | 150 | Comparative example |
| 82 | AB | 56 | 1.4 | 890 | 60 | 807 | 300 | 1.40 | 50 | 150 | Comparative example |

TABLE 5-continued

| No. | Steel type | Cold rolling Rolling reduction % | Thickness mm | Annealing conditions | | | | | | Remark |
|---|---|---|---|---|---|---|---|---|---|---|
| | | | | Annealing temperature °C | Annealing holding time sec | Water quenching start temperature °C | *1 °C | *2 % | Water cooling stop temperature °C | Reheating temperature °C | |
| 83 | AC | 56 | 1.4 | 873 | 60 | 829 | 300 | 1.40 | 50 | 150 | Comparative example |
| 84 | E | 54 | 1.4 | 700 | 60 | 680 | 120 | 1.40 | 50 | 150 | Comparative example |

*1: Surface temperature of steel sheet bound with rollers
*2: Ratio of binding pressure applied to transverse center of steel sheet to binding pressure applied to transverse end of steel sheet at position at which steel sheet was bound with rollers (binding pressure at transverse center/binding pressure at transverse end)

2. Evaluation Methods

The steel microstructure of each of the steel sheets prepared under the above various production conditions was analyzed in order to determine the fraction of each microstructure component. The steel sheets were subjected to a tensile test in order to determine tensile properties such as tensile strength. The steel sheets were subjected to a delayed fracture test in order to determine delayed fracture resistance. The shape of each of the steel sheets was measured in order to determine shape uniformity. The methods used in the above evaluations were the same as the methods described in Example 1.

3. Evaluation Results

Tables 6 and 7 list the evaluation results.

TABLE 6

| No. | Steel type | Microstructure | | | Transformation temperature | Residual stress | | Tensile properties | | Delayed fracture resistance | | Shape | Remark |
|---|---|---|---|---|---|---|---|---|---|---|---|---|---|
| | | M % | F % | Balance % | Ms °C | Transverse center MPa | *1 % | YS MPa | TS MPa | Critical load stress MPa | *2 % | *3 mm | |
| 1 | A | 30 | 66 | 4 | 392 | 550 | 107 | 648 | 772 | 680 | 102 | 6 | Example |
| 2 | | 35 | 62 | 3 | 402 | 320 | 97 | 657 | 782 | 700 | 97 | 3 | Example |
| 3 | | 32 | 67 | 1 | 396 | 960 | 74 | 651 | 775 | 640 | 70 | 22 | Comparative example |
| 4 | | 36 | 62 | 2 | 404 | 350 | 101 | 640 | 780 | 720 | 100 | 5 | Example |
| 5 | B | 42 | 56 | 2 | 392 | 540 | 108 | 824 | 981 | 860 | 110 | 6 | Example |
| 6 | | 48 | 49 | 3 | 411 | 880 | 118 | 822 | 990 | 800 | 119 | 9 | Comparative example |
| 7 | | 45 | 50 | 5 | 402 | 330 | 101 | 838 | 986 | 940 | 102 | 5 | Example |
| 8 | | 40 | 56 | 4 | 385 | 320 | 102 | 813 | 980 | 920 | 104 | 3 | Example |
| 9 | C | 55 | 42 | 3 | 365 | 970 | 85 | 1000 | 1220 | 870 | 86 | 6 | Comparative example |
| 10 | | 59 | 39 | 2 | 371 | 510 | 91 | 1028 | 1224 | 1110 | 94 | 4 | Example |
| 11 | | 56 | 42 | 2 | 367 | 420 | 96 | 976 | 1220 | 1060 | 96 | 6 | Example |
| 12 | | 53 | 42 | 5 | 362 | 360 | 103 | 1020 | 1214 | 1110 | 105 | 3 | Example |
| 13 | D | 84 | 14 | 2 | 398 | 850 | 112 | 1165 | 1438 | 1110 | 113 | 6 | Comparative example |
| 14 | | 86 | 9 | 5 | 400 | 310 | 109 | 1182 | 1442 | 1310 | 108 | 6 | Example |
| 15 | | 90 | 7 | 3 | 404 | 350 | 104 | 1233 | 1451 | 1320 | 105 | 2 | Example |
| 16 | | 85 | 12 | 3 | 399 | 980 | 86 | 1167 | 1441 | 1130 | 84 | 6 | Comparative example |
| 17 | E | 98 | 2 | 0 | 417 | 320 | 102 | 1277 | 1538 | 1420 | 103 | 17 | Comparative example |
| 18 | | 93 | 5 | 2 | 412 | 360 | 101 | 1300 | 1529 | 1410 | 101 | 11 | Example |
| 19 | | 92 | 6 | 2 | 411 | 350 | 102 | 1068 | 1257 | 1140 | 101 | 6 | Example |
| 20 | | 99 | 1 | 0 | 418 | 330 | 103 | 1030 | 1241 | 1160 | 104 | 3 | Example |
| 21 | F | 93 | 2 | 5 | 385 | 350 | 103 | 1404 | 1733 | 1670 | 104 | 20 | Comparative example |
| 22 | | 97 | 3 | 0 | 389 | 340 | 102 | 1465 | 1744 | 1680 | 102 | 5 | Example |
| 23 | | 93 | 5 | 2 | 385 | 330 | 103 | 1440 | 1735 | 1640 | 103 | 6 | Example |
| 24 | | 100 | 0 | 0 | 392 | 320 | 103 | 1398 | 1748 | 1690 | 102 | 3 | Example |
| 25 | G | 96 | 3 | 1 | 358 | 400 | 104 | 1395 | 1701 | 1520 | 104 | 21 | Comparative example |
| 26 | | 95 | 1 | 4 | 357 | 440 | 103 | 1409 | 1697 | 1500 | 103 | 9 | Example |
| 27 | | 100 | 0 | 0 | 361 | 470 | 103 | 1436 | 1709 | 1560 | 104 | 6 | Example |
| 28 | | 94 | 3 | 3 | 356 | 450 | 101 | 1424 | 1695 | 1540 | 103 | 3 | Example |
| 29 | H | 98 | 2 | 0 | 368 | 330 | 103 | 1899 | 2288 | 2140 | 102 | 10 | Example |
| 30 | | 96 | 0 | 4 | 365 | 350 | 103 | 1843 | 2275 | 2130 | 103 | 9 | Example |
| 31 | | 95 | 1 | 4 | 363 | 350 | 102 | 1909 | 2273 | 2090 | 104 | 11 | Example |
| 33 | I | 48 | 48 | 4 | 146 | 340 | 101 | 1211 | 1495 | 1420 | 103 | 9 | Example |
| 35 | J | 98 | 2 | 0 | 394 | 410 | 100 | 1414 | 1724 | 1490 | 101 | 6 | Example |
| 36 | | 97 | 0 | 3 | 393 | 850 | 101 | 1412 | 1722 | 1320 | 99 | 6 | Comparative example |

TABLE 6-continued

| No. | Steel type | Microstructure M % | F % | Balance % | Transformation temperature Ms °C. | Residual stress Transverse center MPa | *1 % | Tensile properties YS MPa | TS MPa | Delayed fracture resistance Critical load stress MPa | *2 % | Shape *3 mm | Remark |
|---|---|---|---|---|---|---|---|---|---|---|---|---|---|
| 37 |   | 96 | 4 | 0 | 392 | 480 | 100 | 1445 | 1720 | 1520 | 99 | 2 | Example |
| 38 | K | 99 | 1 | 0 | 391 | 450 | 102 | 1371 | 1714 | 1420 | 103 | 6 | Example |
| 39 |   | 96 | 4 | 0 | 388 | 560 | 102 | 1418 | 1708 | 1530 | 102 | 11 | Example |
| 40 |   | 96 | 4 | 0 | 388 | 540 | 103 | 1450 | 1706 | 1510 | 101 | 17 | Comparative example |
| 41 | L | 94 | 6 | 0 | 378 | 430 | 102 | 1127 | 1374 | 1190 | 100 | 9 | Example |
| 42 |   | 93 | 6 | 1 | 378 | 410 | 102 | 1123 | 1370 | 1180 | 100 | 17 | Comparative example |
| 43 |   | 93 | 3 | 4 | 378 | 400 | 102 | 1122 | 1368 | 1160 | 100 | 12 | Example |
| 44 | M | 85 | 13 | 2 | 368 | 550 | 99 | 1154 | 1358 | 1180 | 102 | 9 | Example |
| 45 |   | 90 | 8 | 2 | 372 | 540 | 99 | 1132 | 1364 | 1160 | 101 | 6 | Example |
| 46 |   | 91 | 4 | 5 | 372 | 550 | 100 | 1160 | 1365 | 1200 | 103 | 17 | Comparative example |

M: Area fraction of martensite,
F: Area fraction of ferrite,
Balance: Area fraction of balance
*1: Ratio of residual stress at transverse end to residual stress at transverse center (residual stress at transverse end/residual stress at transverse center)
*2: Ratio of critical load stress at transverse end to critical load stress at transverse center (critical load stress at transverse end/critical load stress at transverse center)
*3: Maximum amount of warpage of steel sheet sheared to length of 1 m in longitudinal direction

TABLE 7

| No. | Steel type | Microstructure M % | F % | Balance % | Transformation temperature Ms °C. | Residual stress Transverse center MPa | *1 % | Tensile properties YS MPa | TS MPa | Delayed fracture resistance Critical load stress MPa | *2 % | Shape *3 mm | Remark |
|---|---|---|---|---|---|---|---|---|---|---|---|---|---|
| 47 | N | 90 | 6 | 4 | 388 | 350 | 94 | 1357 | 1635 | 1570 | 95 | 6 | Example |
| 48 |   | 94 | 2 | 4 | 392 | 990 | 72 | 1363 | 1642 | 1310 | 71 | 30 | Comparative example |
| 49 |   | 98 | 1 | 1 | 396 | 320 | 95 | 1384 | 1648 | 1560 | 95 | 10 | Example |
| 50 |   | 95 | 1 | 4 | 393 | 310 | 95 | 1397 | 1643 | 1580 | 93 | 19 | Comparative example |
| 51 | O | 98 | 2 | 0 | 395 | 850 | 109 | 1296 | 1581 | 1260 | 110 | 6 | Comparative example |
| 52 |   | 96 | 0 | 4 | 394 | 430 | 108 | 1275 | 1574 | 1530 | 108 | 3 | Example |
| 53 |   | 96 | 2 | 2 | 394 | 450 | 108 | 1339 | 1575 | 1540 | 110 | 20 | Comparative example |
| 54 |   | 95 | 0 | 5 | 393 | 780 | 108 | 1258 | 1573 | 1440 | 109 | 1 | Example |
| 55 | P | 96 | 2 | 2 | 410 | 920 | 109 | 1362 | 1622 | 1320 | 109 | 6 | Comparative example |
| 56 |   | 96 | 1 | 3 | 410 | 690 | 110 | 1315 | 1623 | 1420 | 107 | 6 | Example |
| 57 |   | 97 | 1 | 2 | 411 | 460 | 108 | 1381 | 1625 | 1580 | 108 | 2 | Example |
| 58 |   | 97 | 2 | 1 | 411 | 450 | 108 | 1299 | 1624 | 1580 | 109 | 5 | Example |
| 59 | Q | 94 | 5 | 1 | 407 | 430 | 109 | 1353 | 1670 | 1570 | 109 | 20 | Comparative example |
| 60 |   | 96 | 1 | 3 | 409 | 420 | 109 | 1390 | 1675 | 1580 | 110 | 11 | Example |
| 61 |   | 98 | 1 | 1 | 412 | 430 | 108 | 1425 | 1677 | 1620 | 108 | 6 | Example |
| 62 |   | 98 | 2 | 0 | 412 | 420 | 108 | 1357 | 1675 | 1620 | 110 | 6 | Example |
| 63 | R | 90 | 10 | 0 | 396 | 870 | 112 | 1082 | 1273 | 1060 | 117 | 5 | Comparative example |
| 64 |   | 87 | 13 | 0 | 394 | 460 | 107 | 1064 | 1267 | 1150 | 104 | 6 | Example |
| 65 |   | 88 | 7 | 5 | 394 | 330 | 103 | 1078 | 1268 | 1220 | 103 | 4 | Example |
| 66 |   | 87 | 8 | 5 | 394 | 910 | 86 | 1065 | 1268 | 1030 | 83 | 3 | Comparative example |
| 67 | S | 98 | 2 | 0 | 394 | 520 | 93 | 1172 | 1412 | 1260 | 97 | 6 | Example |
| 68 |   | 90 | 9 | 1 | 388 | 480 | 95 | 1121 | 1401 | 1280 | 93 | 7 | Example |
| 69 |   | 91 | 7 | 2 | 389 | 590 | 106 | 1193 | 1403 | 1280 | 101 | 6 | Example |
| 70 |   | 92 | 6 | 2 | 390 | 340 | 94 | 1137 | 1404 | 1380 | 94 | 8 | Example |
| 71 | T | 97 | 1 | 2 | 379 | 330 | 95 | 1364 | 1663 | 1630 | 94 | 13 | Example |
| 72 |   | 96 | 4 | 0 | 379 | 370 | 95 | 1395 | 1661 | 1610 | 94 | 6 | Example |
| 73 |   | 94 | 1 | 5 | 377 | 340 | 96 | 1393 | 1658 | 1640 | 96 | 6 | Example |
| 74 |   | 97 | 2 | 1 | 379 | 350 | 95 | 1330 | 1662 | 1610 | 95 | 18 | Comparative example |
| 75 | U | 99 | 0 | 1 | 279 | 380 | 94 | 2789 | 3320 | 3200 | 93 | 20 | Comparative example |

TABLE 7-continued

| No. | Steel type | Microstructure M % | Microstructure F % | Microstructure Balance % | Transformation temperature Ms °C. | Residual stress Transverse center MPa | *1 % | Tensile properties YS MPa | Tensile properties TS MPa | Delayed fracture resistance Critical load stress MPa | *2 % | Shape *3 mm | Remark |
|---|---|---|---|---|---|---|---|---|---|---|---|---|---|
| 76 | V | 14 | 86 | 0 | 402 | 320 | 94 | 404 | 475 | 460 | 94 | 4 | Comparative example |
| 77 | W | 89 | 9 | 2 | 425 | 970 | 95 | 1037 | 1280 | 910 | 94 | 6 | Comparative example |
| 78 | X | 95 | 4 | 1 | 333 | 960 | 95 | 1452 | 1815 | 1390 | 94 | 3 | Comparative example |
| 79 | Y | 18 | 82 | 0 | 120 | 320 | 96 | 604 | 710 | 670 | 95 | 6 | Comparative example |
| 80 | Z | 91 | 5 | 4 | 394 | 970 | 95 | 1381 | 1684 | 1330 | 94 | 5 | Comparative example |
| 81 | AA | 94 | 2 | 4 | 400 | 940 | 94 | 1315 | 1604 | 1280 | 95 | 6 | Comparative example |
| 82 | AB | 96 | 2 | 2 | 406 | 950 | 96 | 1288 | 1552 | 1210 | 97 | 6 | Comparative example |
| 83 | AC | 93 | 4 | 3 | 420 | 910 | 95 | 1090 | 1346 | 890 | 96 | 6 | Comparative example |
| 84 | E | 19 | 81 | 0 | 31 | 320 | 99 | 613 | 735 | 630 | 100 | 2 | Comparative example |

M: Area fraction of martensite,
F: Area fraction of ferrite,
Balance: Area fraction of balance
*1: Ratio of residual stress at transverse end to residual stress at transverse center (residual stress at transverse end/residual stress at transverse center)
*2: Ratio of critical load stress at transverse end to critical load stress at transverse center (critical load stress at transverse end/critical load stress at transverse center)
*3: Maximum amount of warpage of steel sheet sheared to length of 1 m in longitudinal direction In Examples above, steel sheets having a TS of 750 MPa or more and a critical load stress of equal to or higher than YS, wherein the ratio of critical load stress at the transverse center of the steel sheet to critical load stress at the transverse end of the steel sheet was 90% or more and 110% or less and the maximum amount of warpage of the steel sheet sheared to a length of 1 m in the longitudinal direction was 15 mm or less, were evaluated as "passed" and denoted as "Example" in Tables 6 and 7. Steel sheets that did not satisfy at least one of the above conditions were evaluated as "Failed" and denoted as "Comparative example" in Tables 6 and 7.

The invention claimed is:

1. A steel sheet having a steel microstructure comprising, by area %, martensite in a range of 20% or more and 100% or less, ferrite in a range of 0% or more and 80% or less, and a balance other than martensite or ferrite being 5% or less,
wherein a residual stress generated at a transverse center of the steel sheet when the steel sheet is subjected to a V-bending process is 800 MPa or less,
a residual stress generated at a transverse end of the steel sheet when the steel sheet is subjected to a V-bending process is in a range of 90% or more and 110% or less of the residual stress generated at the transverse center of the steel sheet, and
a maximum amount of warpage of the steel sheet sheared to a length of 1 m in a longitudinal direction of the steel sheet is 15 mm or less.

2. The steel sheet according to claim 1, wherein the steel sheet has a chemical composition comprising, by mass %:
C: 0.05% or more and 0.60% or less;
Si: 0.01% or more and 2.0% or less;
Mn: 0.1% or more and 3.2% or less;
P: 0.050% or less;
S: 0.0050% or less;
Al: 0.005% or more and 0.10% or less;
N: 0.010% or less; and
the balance being Fe and incidental impurities.

3. The steel sheet according to claim 2, wherein the chemical composition further comprises at least one group selected from the following groups:
Group A: at least one element selected from the group consisting of, by mass %, Cr: 0.01% or more and 0.50% or less, Mo: 0.01% or more and less than 0.15%, and V: 0.001% or more and 0.05% or less,
Group B: at least one element selected from the group consisting of, by mass %, Nb: 0.001% or more and 0.020% or less, and Ti: 0.001% or more and 0.020% or less,
Group C: at least one element selected from the group consisting of, by mass %, Cu: 0.001% or more and 0.20% or less, Ni: 0.001% or more and 0.10% or less,
Group D: by mass %, B: 0.0001% or more and less than 0.0020%, and
Group E: at least one element selected from the group consisting of, by mass %, Sb: 0.002% or more and 0.1% or less, and Sn: 0.002% or more and 0.1% or less.

4. A method for producing a steel sheet according to claim 2, the method comprising:
a hot-rolling step of heating a steel slab having the chemical composition and hot-rolling the steel slab; and
an annealing step of holding a hot-rolled steel sheet prepared in the hot-rolling step at an annealing temperature equal to or higher than an $A_{C1}$ temperature for 30 seconds or more, subsequently starting water quenching at a temperature equal to or higher than a Ms temperature, and, subsequent to water cooling to 100° C. or less, performing reheating to a temperature in a range of 100° C. or more and 300° C. or less,
wherein, while the water cooling is performed for the water quenching in the annealing step, the steel sheet is bound with two rollers arranged to abut onto front and rear surfaces of the steel sheet so as to face each other across the steel sheet when a surface temperature of the steel sheet is equal to or lower than (Ms temperature+ 150° C.), and a ratio of a binding pressure applied to a transverse center of the steel sheet to a binding pressure applied to a transverse end of the steel sheet at a position at which the steel sheet is bound with the two rollers is in a range of 1.05 or more and 2.0 or less.

5. A method for producing a steel sheet according to claim 2, the method comprising:
a hot-rolling step of heating a steel slab having the chemical composition and hot-rolling the steel slab;
a cold-rolling step of cold-rolling a hot-rolled steel sheet prepared in the hot-rolling step; and
an annealing step of holding a cold-rolled steel sheet prepared in the cold-rolling step at an annealing temperature equal to or higher than an $A_{C1}$ temperature for 30 seconds or more, subsequently starting water quenching at a temperature equal to or higher than a Ms temperature, and, subsequent to water cooling to 100° C. or less, performing reheating to a temperature in a range of 100° C. or more and 300° C. or less,
wherein, while the water cooling is performed for the water quenching in the annealing step, the steel sheet is bound with two rollers arranged to abut onto front and rear surfaces of the steel sheet so as to face each other across the steel sheet when a surface temperature of the steel sheet is equal to or lower than (Ms temperature+ 150° C.), and
a ratio of a binding pressure applied to a transverse center of the steel sheet to a binding pressure applied to a transverse end of the steel sheet at a position at which the steel sheet is bound with the two rollers is in a range 1.05 or more and 2.0 or less.

6. A member produced by subjecting the steel sheet according to claim 1 to at least one of a forming process and welding.

7. A method for producing a member, the method comprising a step of subjecting a steel sheet produced by the method for producing a steel sheet according to claim 4 to at least one of a forming process and welding.

8. A method for producing a steel sheet according to claim 3, the method comprising:
a hot-rolling step of heating a steel slab having the chemical composition and hot-rolling the steel slab; and
an annealing step of holding a hot-rolled steel sheet prepared in the hot-rolling step at an annealing temperature equal to or higher than an $A_{C1}$ temperature for 30 seconds or more, subsequently starting water quenching at a temperature equal to or higher than a Ms temperature, and, subsequent to water cooling to 100° C. or less, performing reheating to a temperature in a range of 100° C. or more and 300° C. or less,
wherein, while the water cooling is performed for the water quenching in the annealing step, the steel sheet is bound with two rollers arranged to abut onto front and rear surfaces of the steel sheet so as to face each other across the steel sheet when a surface temperature of the steel sheet is equal to or lower than (Ms temperature+ 150° C.), and
a ratio of a binding pressure applied to a transverse center of the steel sheet to a binding pressure applied to a transverse end of the steel sheet at a position at which the steel sheet is bound with the two rollers is in a range of 1.05 or more and 2.0 or less.

9. A method for producing a steel sheet according to claim 3, the method comprising:
a hot-rolling step of heating a steel slab having the chemical composition and hot-rolling the steel slab;
a cold-rolling step of cold-rolling a hot-rolled steel sheet prepared in the hot-rolling step; and
an annealing step of holding a cold-rolled steel sheet prepared in the cold-rolling step at an annealing temperature equal to or higher than an $A_{C1}$ temperature for 30 seconds or more, subsequently starting water quenching at a temperature equal to or higher than a Ms temperature, and, subsequent to water cooling to 100° C. or less, performing reheating to a temperature in a range of 100° C. or more and 300° C. or less,
wherein, while the water cooling is performed for the water quenching in the annealing step, the steel sheet is bound with two rollers arranged to abut onto front and rear surfaces of the steel sheet so as to face each other across the steel sheet when a surface temperature of the steel sheet is equal to or lower than (Ms temperature+ 150° C.), and
a ratio of a binding pressure applied to a transverse center of the steel sheet to a binding pressure applied to a transverse end of the steel sheet at a position at which the steel sheet is bound with the two rollers is in a range 1.05 or more and 2.0 or less.

10. A member produced by subjecting the steel sheet according to claim 2 to at least one of a forming process and welding.

11. A member produced by subjecting the steel sheet according to claim 3 to at least one of a forming process and welding.

12. A method for producing a member, the method comprising a step of subjecting a steel sheet produced by the method for producing a steel sheet according to claim 8 to at least one of a forming process and welding.

13. A method for producing a member, the method comprising a step of subjecting a steel sheet produced by the method for producing a steel sheet according to claim 9 to at least one of a forming process and welding.

14. A method for producing a member, the method comprising a step of subjecting a steel sheet produced by the method for producing a steel sheet according to claim 13 to at least one of a forming process and welding.

\* \* \* \* \*